(12) United States Patent
Goker et al.

(10) Patent No.: US 10,923,143 B2
(45) Date of Patent: Feb. 16, 2021

(54) MAGNETIC TAPE DEVICE CAPABLE OF DETERMINING THE VERTICAL POSITION OF MAGNETIC HEAD BASED ON PATTERN COMBINATIONS COMPRISING SERVO BAND IDENTIFIERS

(71) Applicant: Quantum LTO Holdings, LLC, San Jose, CA (US)

(72) Inventors: Turguy Goker, San Jose, CA (US); Laurie J. Mintz, San Carlos, CA (US)

(73) Assignee: Quantum LTO Holdings, LLC, San Jose, CA (US)

( * ) Notice: Subject to any disclaimer, the term of this patent is extended or adjusted under 35 U.S.C. 154(b) by 0 days.

(21) Appl. No.: 16/406,448

(22) Filed: May 8, 2019

(65) Prior Publication Data

US 2019/0348067 A1     Nov. 14, 2019

Related U.S. Application Data

(60) Provisional application No. 62/669,735, filed on May 10, 2018.

(51) Int. Cl.
| | | |
|---|---|---|
| *G11B 5/008* | (2006.01) | |
| *G11B 5/012* | (2006.01) | |
| *G11B 5/55* | (2006.01) | |
| *G11B 5/588* | (2006.01) | |
| *G11B 5/584* | (2006.01) | |

(52) U.S. Cl.
CPC .......... *G11B 5/00813* (2013.01); *G11B 5/012* (2013.01); *G11B 5/008* (2013.01); *G11B 5/00817* (2013.01); *G11B 5/00847* (2013.01); *G11B 5/5504* (2013.01); *G11B 5/5513* (2013.01); *G11B 5/5517* (2013.01); *G11B 5/584* (2013.01); *G11B 5/588* (2013.01)

(58) Field of Classification Search
None
See application file for complete search history.

(56) References Cited

U.S. PATENT DOCUMENTS

| | | | |
|---|---|---|---|
| 7,355,805 B2 | 4/2008 | Nakao et al. | |
| 9,443,539 B2 | 9/2016 | Cherubini et al. | |
| 2005/0030662 A1* | 2/2005 | Bui ........................ | G11B 5/584 360/48 |
| 2006/0056095 A1* | 3/2006 | Saitou .................... | G11B 5/584 360/75 |
| 2006/0126208 A1* | 6/2006 | Kitamura ............ | G11B 5/59655 360/51 |
| 2007/0041121 A1* | 2/2007 | Neumann ............ | G11B 5/0083 360/77.12 |
| 2008/0049356 A1* | 2/2008 | Weber .................... | G11B 5/584 360/77.12 |

(Continued)

*Primary Examiner* — Tan X Dinh
(74) *Attorney, Agent, or Firm* — Eschweiler & Potashnik, LLC (57) ABSTRACT

A magnetic tape and servo elements of a magnetic head for reading and writing to the magnetic tape can ascertain servo band signals from different servo bands that are vertically aligned and adjacent to one another. When operating in a write or read mode, at least two servo elements can be activated to respond to a write/read operation based on a determined position across a width of the servo bands in the magnetic tape. The determined position is based on various pattern combinations from different servo band identifiers from the servo band signals.

12 Claims, 6 Drawing Sheets

(56) References Cited

U.S. PATENT DOCUMENTS

| | | | | |
|---|---|---|---|---|
| 2009/0040643 A1* | 2/2009 | Weng | ............... | G11B 5/584 |
| | | | | 360/55 |
| 2010/0232047 A1* | 9/2010 | Cherubini | .......... | G11B 20/1202 |
| | | | | 360/48 |
| 2011/0013307 A1* | 1/2011 | Bui | ............... | G11B 5/584 |
| | | | | 360/52 |
| 2014/0002923 A1* | 1/2014 | Cherubini | .......... | G11B 5/00826 |
| | | | | 360/90 |
| 2015/0092291 A1* | 4/2015 | Cherubini | .......... | G11B 5/00826 |
| | | | | 360/48 |
| 2015/0302875 A1* | 10/2015 | Cherubini | ............... | G11B 27/19 |
| | | | | 360/77.12 |
| 2015/0318006 A1* | 11/2015 | Cherubini | ............... | G11B 5/584 |
| | | | | 360/71 |
| 2015/0318008 A1* | 11/2015 | Cherubini | .......... | G11B 20/1201 |
| | | | | 360/48 |

* cited by examiner

| | | | |
|---|---|---|---|
| 420 — Servo Band UDIM ID | | 3 | 3 |
| 436 — Data Band ID 3 | | | |
| 422 — Servo Band UDIM ID | | 3 | 3 |
| 432 — Data Band ID 1 | | 404 | |
| 424 — Servo Band UDIM ID | | 0 | 0 |
| 430 — Data Band ID 0 | | | 406 |
| 426 — Servo Band UDIM ID | | 0 | 0 |
| 434 — Data Band ID 2 | | 408 | |
| 428 — Servo Band UDIM ID | | 3 | 3 |

MAGNETIC TAPE DEVICE CAPABLE OF DETERMINING THE VERTICAL POSITION OF MAGNETIC HEAD BASED ON PATTERN COMBINATIONS COMPRISING SERVO BAND IDENTIFIERS

REFERENCE TO RELATED APPLICATIONS

This application claims the benefit of U.S. Provisional Application No. 62/669,735 filed May 10, 2018, entitled "DATA BAND IDENTIFICATION FOR TAPE SERVO SYSTEM USING MULTIPLE SERVO BANDS", the contents of which are herein incorporated by reference in their entirety.

FIELD

The present disclosure relates to tape servo systems, and more particularly data band identification using multiple servo bands.

BACKGROUND

Servo signals are recorded on servo bands that are next to data tracks formed along a longitudinal direction of magnetic tape. A magnetic head records or reads a data track based on which servo band along the tape width the head is positioned. Linear Tape-Open (LTO) tape format has 4 data bands isolated on each side by individual servo bands, so for 4 data bands there is a total of 5 servo bands. Each data band is uniquely identifiable by using servo band information. Servo bands are timing signals based on chevron stripes, which carry both tracking position error signal (PES) and encoded data information that identifies tape position, manufacturing information and servo or data band identification information.

In LTO 1 through 6 standard generations, data bands are uniquely identified by detecting the longitudinal offset that existed between the two servo bands on either side of each data band. Thus, both servo band information is used by a defined relationship using a longitudinal offset dimension to detect which data band the magnetic head was located at. The longitudinal physical dimensional shift uniquely identifies each data band by measuring each of servo band information/data together.

In LTO 7 standard, the format changed to use each servo band to individually identify the data bands by encoding unique identifiers as part of the servo format longitudinal position information (LPOS) by using frame encoding techniques with pulse position modulation to encode information. This allowed servo bands to be aligned vertically which is an improved manufacturing process and provides higher servo frame sampling capability for higher track densities. However, this new format also enabled only a single servo head to be active to determine where one is located, whereas the previous method required both to be read simultaneously to determine the data band positions.

BRIEF DESCRIPTION OF THE DRAWINGS

FIG. 4 is an example diagram illustrating another tape servo device or system according to various aspects described.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In consideration of described deficiencies of only a single servo head being read, the use of both can be advantageous for writing operations as potential advantages exists for eliminating write errors or ascertaining location along magnetic tape width, especially when over-writing existing data by reading a single head. In particular, improved accuracy and lower error can be obtained by concurrently, simultaneously, or at about the same time reading two servo bands with different servo elements in write mode of operation. In particular, both servo band information can be acquired by a defined relationship using a longitudinal offset dimension to detect which data band the magnetic head is located at.

Embodiments described herein combine different method techniques, eliminating undesirable features of past formats yet maintain the beneficial features of each format. Embodiments further include additional aspects such as using the actual location of the physical servo heads to assist with the data band identification process. Embodiments further improve on conventional approaches by eliminating undesirable properties and behavior. Embodiments eliminate the physical longitudinal shift as used in original format (LTO 1 to 6). Embodiments also eliminate the use of single reader (or servo element—servo reader or servo writer) to know where the heads are located during the write/read mode (e.g., when the magnetic tape is being written new data to a data band or over-writing old data with new data, or reading data out from the tape). Embodiments further provide that the data band identification is done by both servo bands being read concurrently or simultaneously with respect to one another.

Embodiments further provide that all servo bands are vertically aligned and are without any substantial shift with respect to each adjacent servo band. Embodiments use LPOS servo frame encoding to encode and decode data band identification. Embodiments further provide that the data band ID decoding acquires the knowledge of which servo heads are reading which servo tracks (of a servo band) to determine (or identify) the data bands from one another.

Additional aspects and details of the disclosure further described below with reference to figures.

Figure 1:
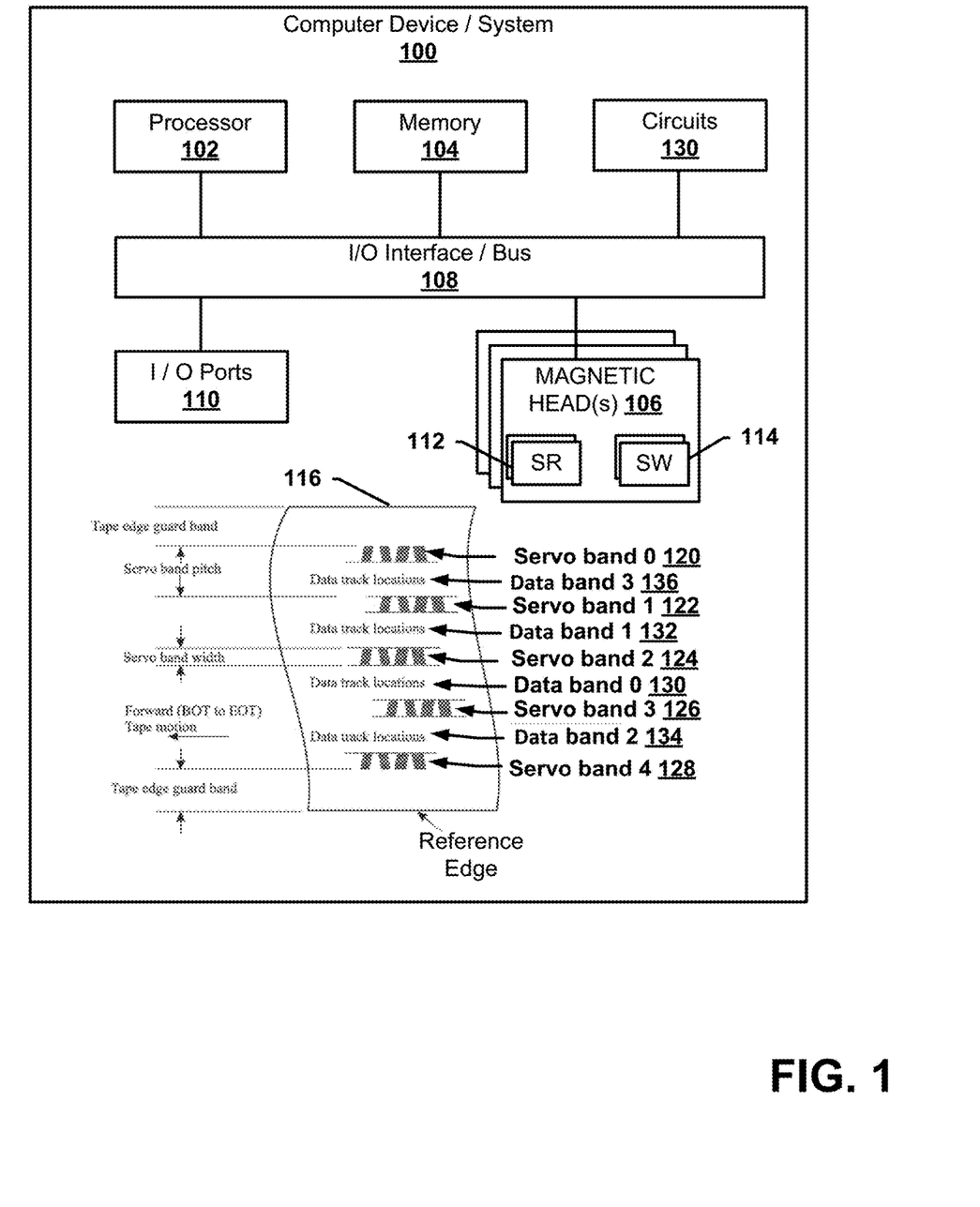
FIG. 1 is a block diagram illustrating a tape servo device or system according to various aspects (embodiments) described.

FIG. 1 illustrates an example computing device or system that example operations, systems, apparatus, or methods described herein, and equivalents, can be processed or operate as a tape servo device or system. The example computing device/system 100 can be a servo device that includes a processor 102, a memory 104, magnetic head device(s) 106 and input/output ports 110 operably connected by an input/output (I/O) interface or an external/internal bus 108. The computer device 100 can include communication or processing circuitry as circuit(s) 130 configured to facilitate providing data or processing working sets of application data to adaptively read or write a magnetic tape 116 via one or more servo readers 112 or servo writers 114, which can also be referred to as servo read heads or servo write heads that have signal processing circuitry (e.g., coils or the like) to read or write data with the magnetic tape 116.

In different examples, circuit 130 can be implemented in hardware, software, firmware, or combinations thereof. While circuit 130 is illustrated as a hardware component attached to the bus 108, it is to be appreciated that in one example, circuit 130 could be implemented in the processor 102, such as a system on a chip (SoC), single integrated chip, microcontroller or the like. In an example configuration of the computer 100, the processor 102 can be a variety of various processors including dual microprocessor, controller, or other single/multi-processor architectures. A memory 104 can include volatile memory and/or non-volatile memory. Non-volatile memory can include, for example, ROM, PROM, or other memory. Volatile memory can include, for example, RAM, SRAM, DRAM, or other memory.

The I/O interface/bus 108 can be a single internal bus interconnect architecture and/or other bus or mesh architectures. While a single bus is illustrated, it is to be appreciated that the computer 100 can communicate with various devices, logics, and peripherals using other busses (e.g., PCIE, 1394, USB, Ethernet). The bus 108 can be types including, for example, a memory bus, a memory controller, a peripheral bus, an external bus, a crossbar switch, a local bus, or external/internal interface.

The magnetic tape 116 comprises a plurality of servo bands (e.g., Servo bands 0 thru 4, referenced 120-128) with a plurality of data bands (e.g., Data bands 0 thru 3, references 130-136). As can be seen the tape is forwarded from a beginning of tape (BOT) to an end of tape (EOT) moving in the direction of the arrow from a right to a left direction as illustrated, for example.

As the LTO standards specify, multiple servo locations can be defined within each servo band (e.g., 120-128). These servo locations can be used for track following while the cartridge is being operated in a cartridge drive (not shown). The servo bands (e.g., 120-128) can be written prior to the cartridge being usable for data storage and retrieval. All servo locations can be located at specific distances from the Tape Reference Edge, which is the bottom edge of the tape. Each servo band (e.g., 120-128) can contain servo frames consisting of servo stripes (e.g., chevron stripes, or the like). Servo frames can be encoded as Longitudinal position POS words to provide longitudinal position down the length of the tape (e.g., from BOT to EOT). All servo bands (e.g., 120-128) line up relative to each other across the tape and special fields can identify the servo bands. Here, the servo bands (e.g., 120-128) are offset from one another by which ratio metric data related to the offsets can be used to determine a position of the magnet head or a servo element (e.g., one or more: servo reader(s) 112 or servo writer(s) 114, as servo read and write elements). Data tracks of Data bands (e.g., 130-136) that can be read from or written to can be located between pairs of servo bands (e.g., 120-128).

As observed from FIG. 1 above, the longitudinal physical dimensional shift can uniquely identify each data band by measuring the each servo band information together. Table 1 below shows how these shifts are used to decode where the magnetics heads are at.

TABLE 1

| Servo Band n | Servo Band n + 1 | Relative position of n + 1 servo |
| --- | --- | --- |
| 0 | 1 | Late by 33.33 μm ± 4.16 μm |
| 1 | 2 | Early by 33.33 μm ± 4.16 μm |
| 2 | 3 | Late by 66.67 μm ± 4.16 μm |
| 3 | 4 | Early by 66.67 μm ± 4.16 μm |

This format can be modified to use each servo band to individually identify the data bands by encoding unique identifies as part of the servo format longitudinal position information LPOS by using frame encoding technique which uses pulse position modulation to encode information. This allowed servo bands to be aligned vertically which is an improved manufacturing process and provides higher servo frame sampling capability for higher track densities.

However, this new format also enabled only single servo head to be active to determine where one is whereas the previous method required both be read simultaneously to determine the data band positions. The use of both as a hard requirement can be advantages for writing since potential over writing existing data by reading single head is more than the requirement of simultaneously reading two servo bands.

Embodiments described herein combine at least two methods, eliminating undesirable features of both of different formats yet maintaining the beneficial features of each. Embodiments further add additional aspects such as the actual location of the physical servo heads to assist with the data band/track identification process. Embodiments improve on conventional approaches by eliminating undesirable properties and behavior. Embodiments eliminate the physical longitudinal shift as used in original format (LTO1-6). Embodiments eliminate the use of single reader to know where are the heads during the write or read mode of operation so data can be accurately written to, over-written or read from the magnetic tape. Embodiments provide that the data band identification is done by both servo bands being read simultaneously. Embodiments provide that all servo bands are vertically aligned. Embodiments use LPOS servo frame encoding to encode and decode data band identification. Embodiments further provide that the data band ID decoding uses the knowledge of which servo heads are reading which servo tracks of servo bands to determine the data bands.

Figure 2:
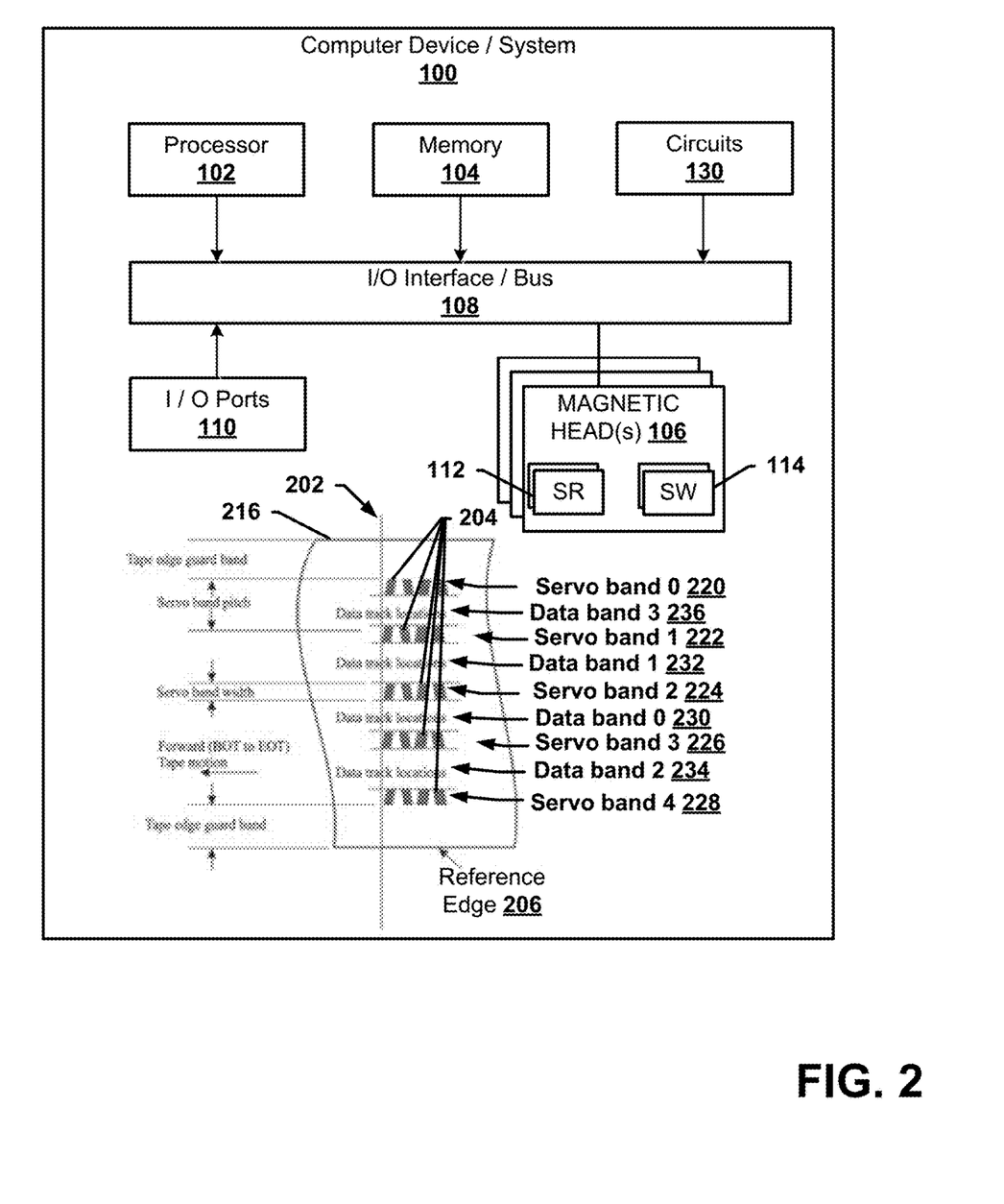
FIG. 2 is an example diagram illustrating another tape servo device or system according to various aspects described.

Referring to FIG. 2, illustrates other aspects of the tape servo device 100 for determining a position or data band identification for a tape magnetic head. The magnetic tape 216 can be similar to the magnetic tape 116, but differ in aspects. For example, servo bands (e.g., 220-228) comprise chevron stripes or frames 204 that can provide timing information or timing. Four sets of these stripes (e.g., 18 stripes with four different sets comprising five stripes, five stripes, four stripes and four stripes at each set) can form a servo frame 204 along the longitudinal direction of the magnetic tape 216. Each servo frame 204, for example, can be encoded with a one or zero, for example, according to different patterns repeating continuously, which can be differentiated based on variances of the stripes with one or more sets of strips. Each servo band 220-228 can comprise a continuous line of servo frames that can repeat in pattern or vary depending on a ratio of the stripes therein with respect to a stripe set/group centre-line/point, or other stripes, for example.

In an aspect, the magnetic tape 216 comprises servo bands (e.g., 220-228) that are vertically aligned at an alignment 202 along the magnetic tape. As such, at each servo frame 204 the servo bands (e.g., 220-228) are vertically aligned with one another across a width of the magnetic tape, the width spanning from an edge of a tape edge guard band to another tape edge guard band at a tape reference edge 206, for example.

A servo element (e.g., SR 112 or SW 114) can move up and down along a vertical direction over the servo bands (e.g., 220-228). For example, one or more servo elements can move up, read a timing or moves down and read another timing depending on the position along the tape, either vertically or longitudinally at a Longitudinal Position (LPOS) transverse along the tape direction. For example, a servo element can be the servo reader 112 or a dedicated servo reader that reads a particular timing by detecting pulses similar in manner to a disk, for example. The processor 102 or controller of the magnetic head 106 can be configured to perform an LPOS method of operation for analyzing and providing data associated with the tape 216. LPOS method(s) for example can be referring to as a differential pulse position modulation, which can be a set of LPOS processes that are related to, or associated with, pulse-position modulation. Pulse-position modulation (PPM) is a signal modulation that can be used for analog and digital signal transmissions where data is being transmitted with short pulses. These short pulses can have the same or similar width and amplitude, in which the parameter that changes is a delay between each pulse. Differential pulse position modulation can be used for performing LPOS methods for determining a location of data along a longitudinal position of the tape 216, for example, or along the forward/tape motion of the tape. Differential pulse position modulation (or D-PPM) can transmit data independently of a clock, with or without a clock. Rather than the delay between pulses taking a reference from the rising edge of a clock, each delay can take reference from the falling edge of the previous pulse, for example. Thus, D-PPM can encode a signal regardless of a clock, and the length of the encoded signal is not necessarily fixed, but can be for one or more bytes, for example. D-PPM can thus be a part of any LPOS method performed as a part of the processor 102 or other controller processes herein, for example.

The processor 102 or controller can thus analyze peaks of read pulses to know which pulse the servo element 112, 114 went through. The servo element can count these peaks based on a dimension or timing between azimuth points (e.g., referred to as an A-B (AB) distance, a fixed distance or half an AC distance of a servo frame) between sets of stripes within a servo frame. By noting the different distances (e.g., AB, AC, azimuth angle, points between peaks, or other related ratio metric data/measurements of peaks or the tape), in particular, the controller 102, or magnetic head 106 can know where the head or tape is positioned or located. This position or location can include the specific data band based on pattern combinations from at least two activated servo elements (e.g., 112, 114), as well as the data track location from among different data tracks of a data band (e.g., 230-236).

In particular, additional bursts can also be used to accommodate for the tape speed not being completely accurate, but having variation, and take into account more than only relying on timing alone, as variation in the speed of the magnetic tape, for example, can cause inaccuracy. For this reason, ratio metric measurements can also be used regardless of the speed variation such that if the head 106 is at portion of the tape (e.g., a top, a middle or a bottom), the points in between become fixed distances by taking into account certain ratio metrics that eliminate a speed variation variable. For example, if in the middle of the magnetic tape 216, dividing by the timing could get a ratio of 0.5 based on distances within the peaks or bursts of the sensor band to accurate determine a location: a particular data band, a particular data track within a data band, an order of one or more vertical positions along the tape, data bands or data tracks, or other similar position information, for example.

In an aspect, at least two servo elements can be activated in order to determine accurately a vertical position or a location from among the servo bands 220-228, data bands 230-236 between different servo band pairs, and the data tracks of the data bands. For example, between servo band zero 220 and servo band one 222, the head 106 can have multiple servo elements as readers 112/writers 114 that are writing and reading based on where the head 106 is relative to those servo bands (e.g., band zero and one). The position of the magnetic head 106 can be determined by the activation of at least two servo elements. In this manner, any transverse changes can be compensated for and further averages can be made for greater accuracy as an advantage over just a single element operating to read from a position in a read mode of operation (where data is being processed or rendered in a read operation). Rather than using one servo element, two can be used, for example, for better signal quality by averaging the noise and the dimensional changes in lateral tape changes or changes away from a tape path direction. A bottom servo element can be on the bottom servo band (e.g., servo band one 222) and the top servo element be on the top servo band (e.g., servo band zero 220), or any other combination on any of the five bands for determining which data band (e.g., Data band 3 236) the magnetic head is at and which data track that is being written to, for example, in a write mode of operation, or read therefrom in a read mode of operation.

The magnetic head 106 can operate in a write mode and a read mode. The magnetic head can operate to activate two servo elements for reading servo band patterns, pattern combinations, or codewords formed from a pattern combination such as in a write and read mode to further determine a location or a vertical position of the head 106 from among the servo bands 220-228, data bands 230-236, and data tracks therein (e.g., about 52 or other plurality at each data band). As such, in response to a write/read operation as a write process to overwrite/write data to/read data from one or more data bands 230-236, the magnetic head 106 can activate more than one servo element for obtaining position information and further ensuring a vertical position or the particular data band/track to be written at or read from.

In one example, the servo bands 220-228 can each comprise data for a servo band signal to be read by the servo elements. Each servo band can comprise different servo band signals that have a unique identifier. The magnetic head 106, processor 102, or other controller component can combine the identifiers from two servo bands to determine a pattern combination or particular codeword that specifically and uniquely identifiers the data band location or data band ID between the pair of servo bands with activated serve elements reading the servo band signals. The pattern combination or codeword combination is then compared to a stored pattern combination or patterned codeword. If a match occurs between the pattern combination and the stored pattern combination, then the particular data band (e.g., data band three 236, or otherwise) that is associated with the stored pattern combination or codeword indicates the location or vertical position of the magnetic head 106 among the different servo bands 220-226 at the particular data band.

Figure 3:
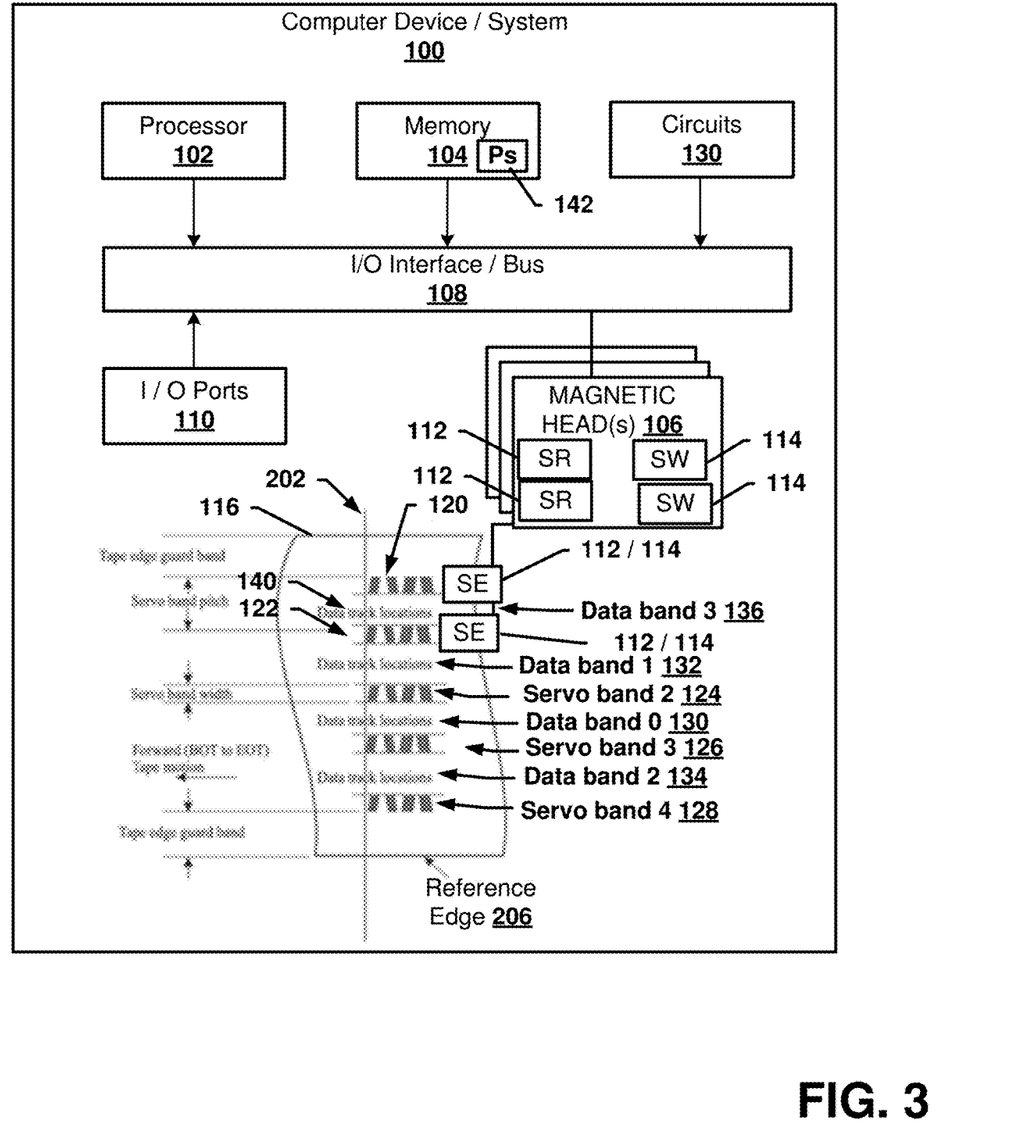
FIG. 3 is an example diagram illustrating another tape servo device or system according to various aspects described.

Referring to FIG. 3, illustrated is another example of the tape servo device 100 for determining a position or data band identification for a tape magnetic head. Here, two servo elements (two SRs, two SWs, or a combination thereof) can determine a servo signal along the sensor band (e.g., 320 and 322) in order to extract a servo band identifier (ID) provided continuously along the magnetic tape and substantially parallel to the other servo bands. Each servo band ID can be a unique identifier from among the servo bands of the tape as well as be repeated from among servo frames and LPOS frames (e.g., 36 servo frames), substantially and vertically aligned with one another. The magnetic head 106 can then analyze the pattern combination or codeword formed from among two servo bands and determine a position of the servo elements 112/114 at a data band, or a data track within a data band, from among the various data bands and tracks on the tape, for example.

Determining the position can further include comparing the pattern combination/codeword formed from two servo band IDs with a corresponding pattern combination 342 stored in a memory (e.g., a memory 104, a memory of the magnetic head 106 or other internal or external memory to the device). If a matching pattern combination is found, then an associated location or position information can be determined based on that which is associated in the memory with the stored pattern 342.

In a write mode of operation or a write operation where data is being written or overwritten at a particular location, a determination of the particular exact location that writing will occur can be advantageous and prevent over-trimming or under-trimming data within the data tracks of a data band, for example. Likewise, ensuring a more precise location for reading data can also be advantageous; although one or more servo elements can be used for read operation(s), and at least two servo elements activated for write operation(s), for example. Further, by ensuring at least two servo elements are activated for write operation the magnetic head 106 is kept from writing to a wrong track, and knowing the precise location along a vertical direction at all times, despite variation in speed or uniform motion direction from mechanical variances is valued for being more precise over time. Not only can the magnetic head 106 or a pair of two or more servo elements know which data band it is at or on, but also where the head is within micron/nano meters on the tape so as to not overwrite a pervious track, even if on the right band. If the magnetic head does not know the exact ratio location accurately, it could over-trim or not trim to a precise dimension at a track or a track number/location 340 based on at least two actuated/activated servo elements (e.g., 112/114) in a write operation. These operations can otherwise become more difficult with greater and greater tape densities being generated on tapes.

In a read mode of operation, for example, both servo elements or at least two, can be utilized if both are actuated or available for use, as in the write mode of operation. If only one servo head is available in the read mode, however, the drive/processor/controller/magnetic head or other component of the device (e.g., 100 to 300) can still read data tracking on the single servo element and locating data bands using a counting servo method or counting each track, for example, by starting the head at the top/bottom edge and moving down/up while detecting each of the servo bands. These bands can thus be counted using feedback, for example, as an actuator position that could come from a coarse stepper motor (not shown) as an actuator could have two motors (not shown), a coarse stepper to move up and down in small steps and a fine linear fine motor to track servo signals for example as a part of or integrated in the circuitry 130.

In particular, the magnetic head 106 can operate to utilize a top and bottom servo element to compensate for Transverse Dimensional Stability (TDS) of the media or magnetic tape and keep from writing at a data track without trimming to a perfect dimension (e.g., being overly narrow) and afterwards possibly not enable reading of the track, thus resulting in a hard read error, for example. In the read mode, only one head could be used to know which data band the servo elements or magnetic head are in, and is not as critical/disrupting to the device/system 100 if an error occurs, as such the magnetic head can actuate one servo element to determine position for a read operation, and two servo elements for reading the signals from the servo bands and determining a pattern combination/codeword for writing operation(s).

In an aspect, the pattern combination can be formed from servo band IDs extracted from unique servo band IDs or Unique Data Band Identification Method (UDIMs) based on data from different servo bands extracted concurrently or simultaneously with a pair of servo elements. The location can be derived based on azimuth or ratio metric measurements based lateral information for tracking, as embedded ones and zeros with the stripes patterns in a five stripe, five stripe, four stripe, four stripe formation, and changes in distances between the stripes of any subset of stripes therein or the stripes with respect to one another in a servo frame. This information can indicate a frame location (e.g., a servo frame location within an LPOS frame or the like), and can also provide data band identification or a data band ID or a servo band ID. By combination different IDs from among servo bands to derive a pattern combination or codeword, the magnetic head can know precisely where it is located in a write/read operation to a data track for example. By referencing the pattern to an associated position, the magnetic head 106 can determined an exact vertical location among any one or more data bands.

In one aspect, during write mode, the device/systems can obtain an exact data band position by writing into a data field a small metadata in each data set so even without the servo(s), the drive can search data fields and detect those repeating meta data in order to know which band it is in at any one time.

In aspect, each servo band 330-336, for example, can be identified by the following code embedded in the LPOS using a servo frame encoding method. This identification can be demonstrated in the figure or table below, as an example, where the ID encoded is not limited to any particular ID and can be numeric, alphabetic, alphanumeric or some other symbol (mark) as an ID, or a combination thereof. As such, any combination of IDs from a combination of different servo bands provides a unique or different pattern combination/codeword using at least two activated servo elements in contrast to only one servo element. Table 2 is thus only one example and any variances of IDs or configurations of different IDs can be envisioned to ID a particular band in combination with other IDs of other bands, specifically in order, number of character, for example.

TABLE 2

| | ID encoded per UDIM |
|---|---|
| Servo Band 0 | 3 |
| Servo Band 1 | 3 |
| Servo Band 2 | 0 |
| Servo Band 3 | 0 |
| Servo Band 4 | 3 |

Use of servo head identification as top or bottom plus the UDIM code per servo band can be utilized by the device 100 (e.g., via the magnetic head or processor 102) to correctly identify the data bands where the read and write heads/servo elements are located. This is demonstrated for example as shown below in Table 3. Thus, for example, a first servo element at servo band 320 as a top servo element, and a second servo element as a bottom or below servo element at servo band 322 can be matched up as a codeword or pattern combination to identify the location at data band ID 3, and so on for each row of the table, for example.

TABLE 3

| Data Band ID | Top Servo | Bot Servo |
|---|---|---|
| 3 | 3 | 3 |
| 1 | 3 | 0 |
| 0 | 0 | 0 |
| 2 | 0 | 3 |

It is possible to detect which band the head(s) 106 is/are at by knowing the actual servo head/element and the UDIM number for the pairs of servo tracks (e.g., 320-328). This is demonstrated for example as shown in table 4 below per case.

TABLE 4

| Case: | UDIM | Data Band 0 | Data Band 1 | Data Band 2 | Data Band 3 |
|---|---|---|---|---|---|
| Top Servo Head | 3 | No | Yes | No | Yes |
| Top Servo Head | 0 | Yes | No | Yes | No |
| Bot Servo Head | 3 | No | No | Yes | Yes |
| Bot Servo Head | 0 | Yes | Yes | No | No |

Therefore, reading single servo band is not necessarily possible or desirable to detect which data band the heads are at unless both top and bottom servo heads are read with the knowledge of location of the servo heads as top or bottom.

Referring to FIG. 4, illustrated is an example magnetic heads with servo elements 402-408 located on the top and bottom on each servo band for a write/read operation. The magnetic heads with two servo heads 402-408 have two servo heads or elements activated on two different servo bands 420-428, respectively. Although different servo band UDIM IDs are continuous along the magnetic tape 416, or are even the same with respect to an adjacent servo band, the combination of each servo band identifier as a pattern combination is what can uniquely identify the location of the magnetic head with servo elements 402-408, as such no combination of two identifiers is the same, or in the same order from top to bottom or bottom to top servo band, for example. Additionally, these particular servo band identifiers (e.g., 3 for servo band 420, 3 for servo band 422, 0 for servo band 424, 0 for servo band 426, and 3 for servo band 428) can be different than the given example by number, character, letter, symbol, asci, alpha-numeric, or the like, such that no two combinations provide the same pattern combination or codeword by order or sequence, or otherwise, for example.

During a write/read mode of operation, where the magnetic head is writing data or overwriting existing data to a data band 430-436, or one or more data tracks therein, then at least two servo heads/elements are actuated, turned on and operational for determining position accuracy. A magnetic head (e.g., 106) has both servo band identifiers as a combined pattern or codeword from vertically aligned servo band IDs, where one position, for example, is on data band 3 436, the top servo element of servo elements 402 has a particular ID and bottom or servo band UDIM ID 422 must have the identifier (e.g., 3) associated with.

In an embodiment, each servo band ID can comprise a bit pattern forming one or more bytes that repeats along the longitudinal direction of the tape, in which a pattern combination from among two servo band IDs is unique for each pair of servo bands. For example, an n-bit pattern, in which n is an integer of at least one (e.g., a four-bit pattern), or other number of bits as a byte can be configured at each servo band 420-428 continuously along servo frames so that a current data band or track can be determined along a vertical position of the tape width. The servo frame(s) for all the bands can start at a same longitudinal location being vertically aligned within a tolerance (e.g., in micro meters, or other minute tolerance). For example, a byte binary servo band identifier field can provide the byte as the servo band identifier in the servo manufacturer word (SMW) or across servo frames of an LPOS word (e.g., about 36 servo frames).

While the methods or process flows are illustrated and described herein as a series of acts or events, it will be appreciated that the illustrated ordering of such acts or events are not to be interpreted in a limiting sense. For example, some acts can occur in different orders/concurrently with other acts or events apart from those illustrated/described herein. In addition, not all illustrated acts could be required to implement one or more aspects or embodiments of the description herein. Further, one or more of the acts depicted herein may be carried out in one or more separate acts or phases.

Figure 5:
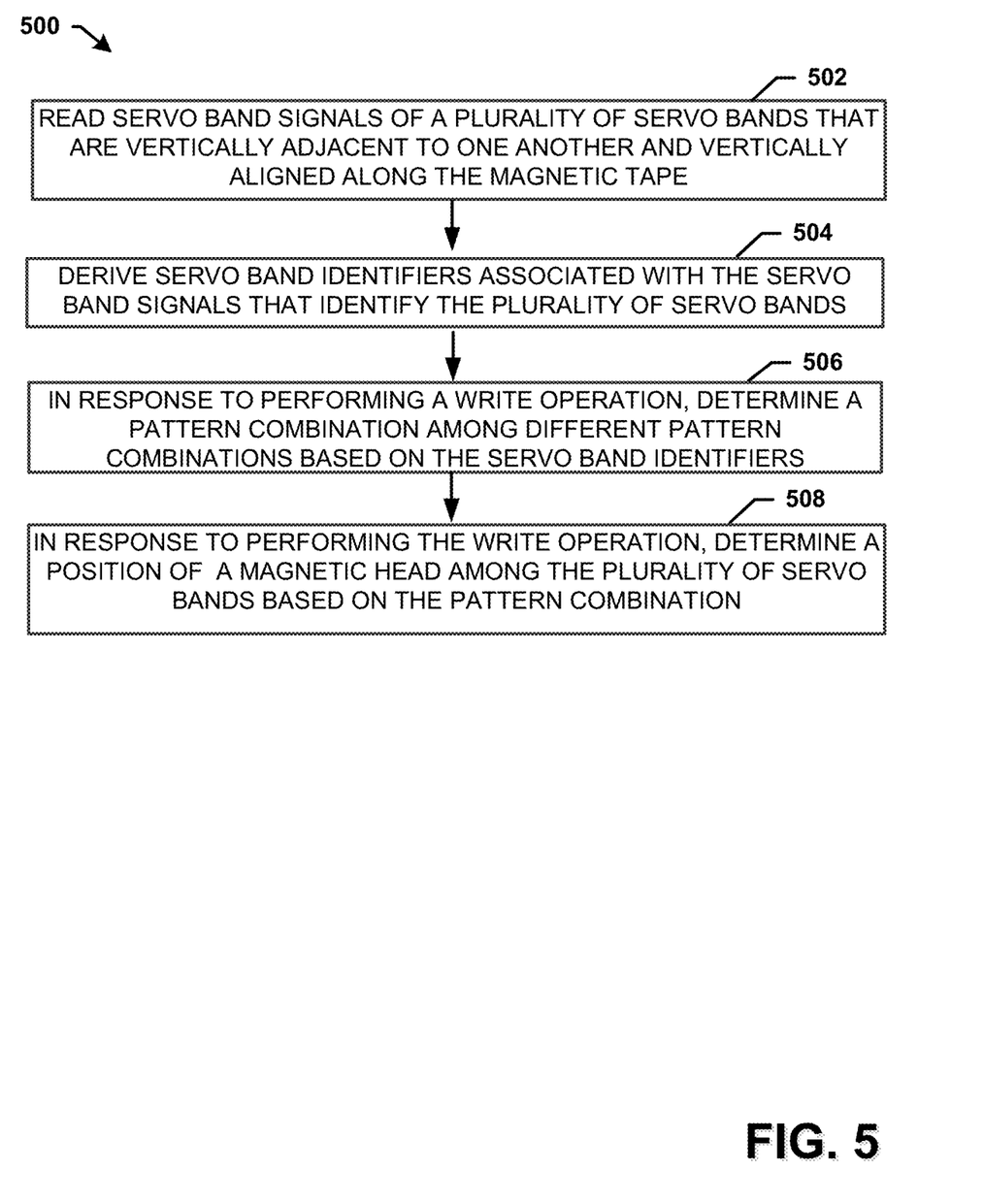
FIG. 5 is an example process flow for tape servo device or system devices to identify position along a magnetic tape in accordance with various aspects described.

Referring to FIG. 5, illustrated is an example process flow 500 for identifying a position of a magnetic head on a magnetic tape. These acts or steps of the process flow 500 can apply to one or both read/write modes of operation for reading data from a more precise, exact location along a width of the tape, writing data at the location or over-writing there-at, for example. Write mode is only one example here for illustrated one or more particular aspects/embodiments herein. The method 500 can initiate at 502, with reading, via at least two servo band elements (e.g., 112/114) concurrently or simultaneously, different servo band signals of servo bands that are vertically adjacent to one another and vertically aligned along the magnetic tape (e.g., 116 thru 416) such as along a width from a top edge to a bottom edge or reference edge (e.g., edge 206).

At 504, the process flow 500 includes deriving servo band identifiers associated with the servo band signals that identify the plurality of servo bands.

At 506, in response to performing a write/read operation, the magnetic head or associated processor (e.g., 102) can determine a pattern combination or an associated codeword of bits or byte(s) from among a plurality of pattern combinations based on the servo band identifiers. Each pattern combination or codeword can be unique to a pair of servo bands along the width of the tape, for example.

At 508, in response to performing the write/read operation, determining a position of the magnetic head can be further determined among the plurality of servo bands based on the pattern combination.

In other aspects, the plurality of pattern combinations can comprise a first pattern combination formed by a first servo band identifier of a first servo band and a second servo band identifier of second servo band, a second pattern combination formed by the second servo band identifier and a third servo band identifier of a third servo band, a third pattern combination formed by the third servo band identifier and a fourth servo band identifier of a fourth servo band, a fourth pattern combination formed by the fourth servo band identifier and a fifth servo band identifier of a fifth servo band.

Data can be written to a data band via servo write heads/elements (e.g., SW 114) or read via servo read heads/elements (e.g., SW 112) based on the position of the at least two servo band elements of the magnetic head that is determined from among the plurality of servo bands and along a vertical width of the magnetic tape based on the pattern combination or a comparison of the combination in a stored memory, for example.

In other aspects, in response to the write/read operation corresponding to a different position than the determined position, the process flow can include re-locating or adjusting the magnetic head and determining another pattern combination with the at least two servo band elements being activated to read a pair of servo bands of the plurality of servo bands.

In an embodiment, in response to the another pattern combination matching a stored another pattern combination that is associated with the different position, data can be written to a data band or data track of a data band located between the pair of servo bands or a data track, wherein the determined position and the different position comprise different vertical positions along a vertical width of the magnetic tape among the plurality of servo bands.

One of ordinary skill in the art can appreciate that the various non-limiting embodiments of the shared systems and methods described herein can be implemented in connection with any computer or other client or server device, which can be deployed as part of a computer network or in a distributed computing environment, and can be connected to any kind of data store. In this regard, the various non-limiting embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the shared shopping mechanisms as described for various non-limiting embodiments of the subject disclosure.

Figure 6:
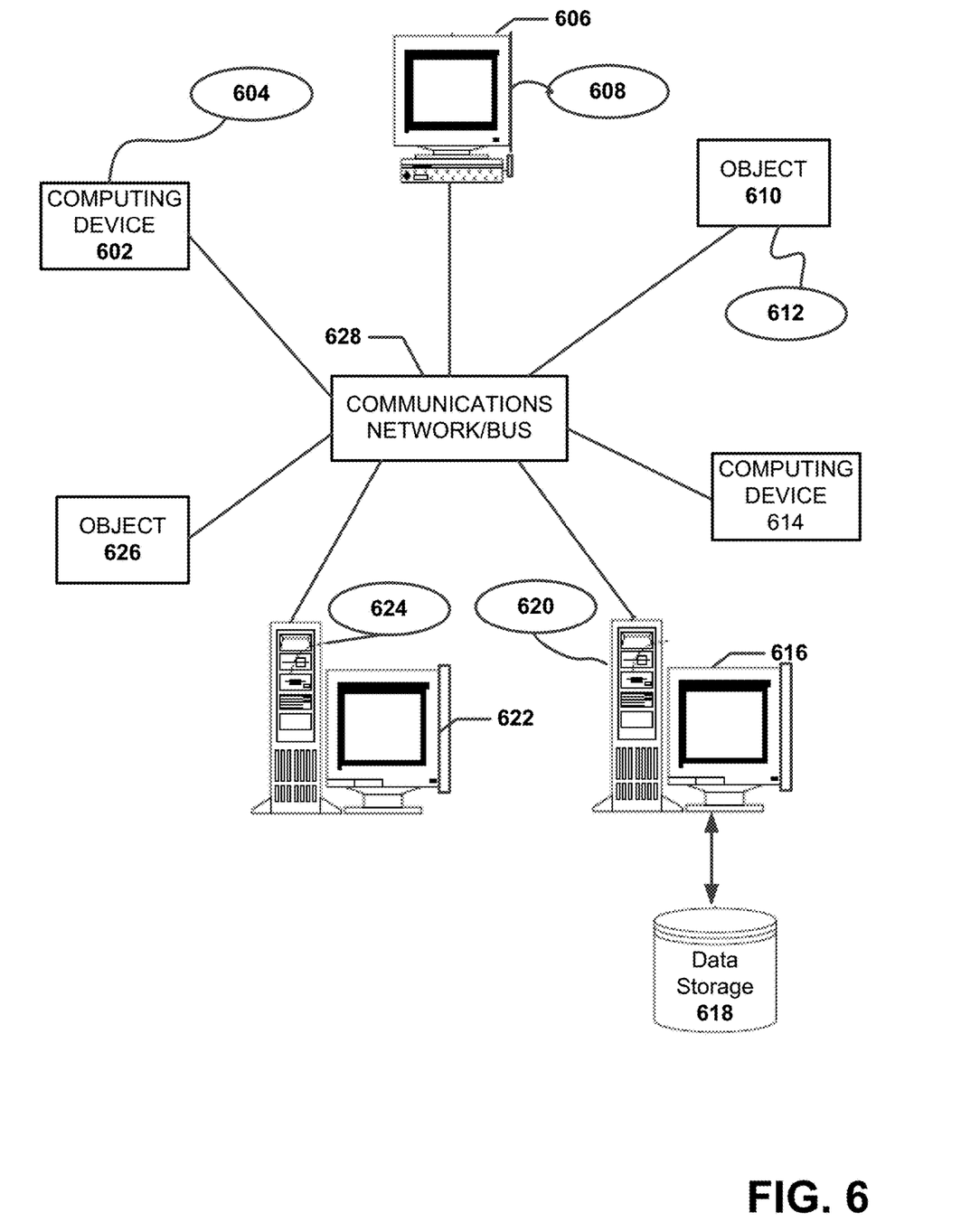
FIG. 6 is a block diagram representing exemplary non-limiting networked environments in which various non-limiting embodiments described herein can be implemented.

FIG. 6 provides a schematic diagram of an exemplary networked or distributed computing environment that can implement one or more components, devices or systems for data band identification for tape servo devices/systems using multiple servo bands as described herein. The distributed computing environment comprises computing objects 610, 626, etc. and computing objects or devices 602, 606, 610, 614, etc., which may include programs, methods, data stores, programmable logic, etc., as represented by applications 604, 608, 612, 620, 624. It can be appreciated that computing objects 612, 626, etc. and computing objects or devices 602, 606, 610, 614, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, etc. can communicate with one or more other computing objects 610, 612, etc. and computing objects or devices 620, 622, 624, 626, etc. by way of the communications network 628, either directly or indirectly. Even though illustrated as a single element in FIG. 6, communications network 628 may comprise other computing objects and computing devices that provide services to the system of FIG. 6, and/or may represent multiple interconnected networks, which are not shown. Each computing object 610, 626, etc. or computing object or device 620, 622, 624, 626, etc. can also contain an application, such as applications 604, 608, 612, 620, 624, that might make use of an API, or other object, software, firmware and/or hardware, suitable for communication with or implementation of the shared shopping systems provided in accordance with various non-limiting embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the shared shopping systems as described in various non-limiting embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 6, as a non-limiting example, computing objects or devices 620, 622, 624, 626, etc. can be thought of as clients and computing objects 610, 626, etc. can be thought of as servers where computing objects 610, 626, etc., acting as servers provide data services, such as receiving data from client computing objects or devices 620, 622, 624, 626, etc., storing of data, processing of data, transmitting data to client computing objects or devices 620, 622, 624, 626, 628, etc., although any computer can be considered a client, a server, or both, depending on the circumstances. Any of these computing devices may be processing data, or requesting services or tasks that may implicate the shared shopping techniques as described herein for one or more non-limiting embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 640 or bus is the Internet, for example, the computing objects 610, 626, etc. can be Web servers with which other computing objects or devices 620, 622, 624, 626, etc. communicate via any of a number of known protocols, such as the hypertext transfer protocol (HTTP). Computing objects 610, 612, etc. acting as servers may also serve as clients, e.g., computing objects or devices 620, 622, 624, 626, etc., as may be characteristic of a distributed computing environment.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components or circuits that provide the described functionality. In some embodiments, the circuitry can be implemented in, or functions associated with the circuitry can be implemented by, one or more software or firmware modules. In some embodiments, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Other examples of the various aspects/embodiments herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations can include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

The following includes definitions of selected terms employed herein. The definitions include various examples and/or forms of components that fall within the scope of a term and that can be used for implementation. The examples are not intended to be limiting. Both singular and plural forms of terms can be within the definitions.

"Computer-readable storage medium" or "computer-readable storage device" as used herein, refers to a non-transitory medium that stores instructions and/or data. "Computer-readable storage medium" or "computer-readable storage device" does not refer to propagated signals, per se. A computer-readable medium can take forms, including, but not limited to, non-volatile media, and volatile media. Non-volatile media can include, for example, optical disks, magnetic disks, and other disks. Volatile media can include, for example, semiconductor memories, dynamic memory, and other memories. Common forms of a computer-readable medium or computer-readable storage device can include, but are not limited to, a floppy disk, a flexible disk, a hard disk, a magnetic tape, a solid state device (SSD) a shingled magnetic recording (SMR) device, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store can be, for example, a database, a table, a file, a data structure (e.g. a list, a queue, a heap, a tree) a memory, a register, or other repository. In different examples, a data store can reside in one logical and/or physical entity and/or can be distributed between two or more logical and/or physical entities.

An "operable connection", or a connection by which entities are "operably connected", is one in which signals, physical communications, or logical communications can be sent or received. An operable connection can include a physical interface, an electrical interface, or a data interface. An operable connection can include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions can be embodied in various forms including routines, algorithms, modules, methods, threads, or programs including separate applications or code from dynamically linked libraries.

"User", as used herein, includes but is not limited to one or more persons, software, logics, applications, processors, circuits, computers or other devices, or combinations of these.

While example methods, apparatus, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A magnetic tape comprising:
a plurality of servo bands comprising corresponding servo band signals to be read by servo elements of a magnetic head, wherein the plurality of servo bands comprises servo band frames that are vertically aligned with respect to one another; and
a plurality of pattern combinations comprising servo band identifiers of the corresponding servo band signals from different servo bands of the plurality of servo bands;
wherein a pattern combination of the plurality of pattern combinations indicates a vertical position that is associated with the servo elements of the magnetic head among the plurality of servo bands when performing at least one of: a write operation or a read operation to the magnetic tape, wherein the pattern combination is formed by a first servo band identifier and a second servo band identifier corresponding to different servo bands, respectively, and matches a stored pattern combination to receive write data of the write operation, or read data of the read operation, at a data band of the magnetic tape.

2. The magnetic tape of claim 1, wherein the first servo band identifier and the second servo band identifier identify a location of the data band from among different data bands.

3. The magnetic tape of claim 1, wherein the different servo bands comprise a first servo band and a second servo band, wherein the servo elements of the magnetic tape comprise a first servo element configured to read the first servo band identifier of the first servo band, and a second servo element configured to read the second servo band identifier of the second servo band that is vertically adjacent, above or below, the first servo band.

4. The magnetic tape of claim 1, wherein the different servo bands comprise a first servo band and a second servo band, wherein the plurality of pattern combinations comprise a first pattern combination formed by the first servo band identifier of the first servo band and the second servo band identifier of the second servo band, and a second pattern combination formed by a third servo band identifier of a third servo band, and the second servo band identifier or a fourth servo band identifier of a fourth servo band.

5. The magnetic tape of claim 1, further comprising a plurality of data bands, each located between at least two vertically aligned and adjacent servo bands forming servo band pairs of the plurality of servo bands, and associated with a different pattern combination of the plurality of pattern combinations for position tracking of the at least one of: the write operation or the read operation.

6. The magnetic tape of claim 1, wherein the pattern combination of the plurality of pattern combinations is read in response to activation of at least two servo elements of the magnetic head that concurrently read the first servo band identifier and the second servo band identifier for the at least one of: the write operation or the read operation.

7. An apparatus of a magnetic tape, comprising
a magnetic head comprising a first servo element configured to read a first servo signal from a first servo band of the magnetic tape, and a second servo element configured to read a second servo signal from a second servo band of the magnetic tape;
a processing device, coupled to the magnetic head, configured to determine a vertical location of the magnetic head among a plurality of servo bands along a width of the magnetic tape based on a pattern combination formed by servo band identifiers from the first servo signal and the second servo signal, and generate at least one of: a write operation, or a read operation, based on the vertical location of the magnetic head; and
wherein the first servo band and the second servo band comprise different servo bands with longitudinal position (LPOS) words continuously along the magnetic tape, wherein the LPOS words each comprise a longitudinal position portion with the servo band identifiers of the corresponding servo band signals for forming the pattern combination.

8. The apparatus of claim 7, wherein the magnetic head is configured to adjust a position along the width of the magnetic tape from a first data band to a second data band in response to the at least one of: the write operation or the read operation being associated with a different vertical location matching a different pattern combination than the pattern combination associated with the vertical location, or the pattern combination being associated with the second data band instead of the first data band.

9. The apparatus of claim 7, further comprising a servo write element configured to write data to a data band between the first servo band and the second servo band, or a servo read element configured to read data from a data band between the first servo band and the second servo band, in response to the pattern combination matching a stored pattern combination that is associated with the data band.

10. The apparatus of claim 7, wherein the magnetic tape comprises different data bands between different pairs of servo bands along the width and each of the different data bands is associated with a different pattern combination for tracking positions of the magnetic head during the at least one of: the write operation or the read operation.

11. The apparatus of claim 7, wherein the first servo band and the second servo band comprise servo frames that are vertically aligned to one another across the width of the magnetic tape.

12. The apparatus of claim 7, wherein the magnetic head activates the first servo element and the second servo element to write/read data at a location of a data band from among a plurality of data bands based on whether a stored pattern combination associated with the location of the data band matches the pattern combination.

* * * * *